United States Patent [19]

Hamazaki et al.

[11] Patent Number: 4,553,558
[45] Date of Patent: Nov. 19, 1985

[54] CLEANING DEVICE FOR A FILTER PRESS

[75] Inventors: Haruo Hamazaki, Yao; Makinoda Mitsugi, Kobe, both of Japan

[73] Assignee: Kurita Machinery Manufacturing Company Limited, Osaka, Japan

[21] Appl. No.: 584,314

[22] Filed: Feb. 28, 1984

[51] Int. Cl.[4] ................................................ B08B 3/02
[52] U.S. Cl. ...................................... 134/181; 74/89; 74/422; 118/321; 118/323
[58] Field of Search ............... 134/172, 180, 181, 198, 134/199, 52, 104, 116, 129, 137, 138, 140, 144, 148, 157, 76, 77, 82, 83; 239/185, 187, 587, 588; 118/321, 323; 74/89, 17, 380, 422

[56] References Cited

U.S. PATENT DOCUMENTS

| | | | |
|---|---|---|---|
| 3,980,039 | 9/1976 | Henning | 74/422 X |
| 4,129,137 | 12/1978 | Kurita et al. | 134/144 |
| 4,239,431 | 12/1980 | Davini | 118/697 X |
| 4,325,396 | 4/1982 | Gehrmann | 134/181 |
| 4,448,221 | 5/1984 | Murray | 134/172 X |

FOREIGN PATENT DOCUMENTS 1611097 9/1973 Fed. Rep. of Germany .

*Primary Examiner*—Philip R. Coe
*Attorney, Agent, or Firm*—Holman & Stern

[57] ABSTRACT

A cleaning device for a filter press wherein a spray tube for cleaning filter cloths of the filter press is moved in alternate directions during cleaning in a vertically downward position depending from a second carrier movably supported on a first carrier and cleaning liquor is sprayed through spray nozzles provided in the spray tube. When a cleaning cycle is completed, the spray tube is returned by a rack rod and pinion to a slanted waiting position above the filter plates.

3 Claims, 10 Drawing Figures

CLEANING DEVICE FOR A FILTER PRESS

BACKGROUND OF THE INVENTION

1. Field of the Invention

The present invention relates to a filter cloth cleaning device for a filter press wherein cleaning liquor is sprayed onto the filter cloth from a spray tube with a multiplicity of spray nozzles, which is adapted to move along and substantially parallel to each filter cloth.

2. Description of the Prior Art

There have been proposed quite a number of cleaning devices of the type, in which the spray tube is pivoted downwardly into place between filter cloths covering each opened pair of filter plates and the cleaning liquor is sprayed from the spray tube onto the aforesaid filter cloths for cleaning thereof. A device having its spray tube long and large, as disclosed, for example, in West German Pat. No. 1611097, which features the possibility of cleaning the entire surface of the filter cloth through simple movement of the spray tube between the opened pair of opposed filter cloths as aforesaid, has a drawback of requiring a large swing diameter for the spray tube as it is pivoted downwardly into place between adjacent filter cloths and also of requiring a large space around the filter press. Moreover, its spray tube in its waiting position above the filter plates projects substantially beyond the side of the filter press, this interfering with or limiting utilization of the spaces along the sides of or above the filter press.

A solution to the aforesaid problem was proposed by the filter cloth cleaning device of U.S. Pat. No. 4,129,137, in which a spray tube carrier carrying a spray tube erect below filter plates of the filter press is caused to travel both-ways in front of the filter cloth.

This system has an advantage of enabling installation above the filter press of the filter cloth oscillating device for imparting oscillation to the filter cloth for shaking off the filter cake (cake depositing on the filter cloth after filtration), utilizing the ample space available there, Since the cleaning device of the aforesaid U.S. patent, however, has to be kept waiting where it is not exposed to the shower of cake until completion of shaking off of the filter cake, the time required for cleaning is increased, resulting in lowering of the filter press' working efficiency.

The cleaning device of the German patent has arranged on a carrier 33 adapted to be movable on rails laid above and longitudinally of filter plates a cleaning liquor spray tube 14 and a bracket 36 of a work cylinder 6 for lifting and lowering thereof tiltably pivoted by means of a fulcrum shaft 32. The above bracket 36 has its position controlled by a tilting cylinder 34 and its piston 36. Indicated by solid line in FIG. 1 of this patent is the position the device assumes before starting of cleaning, and thereafter the work cylinder 6 operates to alternately lift and lower the cleaning liquor spray tube 14 in its level position for the filter cloth or filter plate to be sprayed with the cleaning liquor.

When the aforesaid bracket 36 is tilted by the tilting cylinder 34, the cleaning liquor spray tube as well as its work cylinder and guides moves into the waiting position indicated by dotted lines in FIG. 1.

Unlike the device disclosed above, the cleaning device of the present invention is contrived to be small in the space it occupies above the filter press.

The cleaning device of the U.S. Pat. No. 4,129,137 comprises a first carrier 12 adapted to be movable on rails under a group of filter plates and a movable unit 11 adapted to be movable thereon. A cleaning liquor spray tube 10 is disposed vertically on the movable unit 11 and is adapted to move sideways and alternately in front of the filter cloth or filter plate for cleaning (by spraying) thereof. Its relationship with the present invention is already described above.

SUMMARY OF THE INVENTION

The object of the present invention is to provide a filter cloth cleaning device for a filter press, which can be let to pivot down into place between filter cloths and withdrawn therefrom to the waiting position, being practically safe from projecting beyond the side of the filter press, and is free from the aforesaid defect.

According to the present invention, there is provided a filter press, in which a spray tube pivotable about a horizontal shaft and displaceable along its own axis and carried by a second carrier adapted to be movable along the longitudinal direction of a filter press is connected with a cleaning liquor feed tube, is let to pivot down into place between an opened and opposed pair of filter cloths and is let to withdraw therefrom and also it is made displaceable along its own axis between the position it assumes upon rotating downward and the working (spraying) position.

BRIEF DESCRIPTION OF THE DRAWINGS

The invention will now be described in detail with reference to the accompanying drawings, wherein.

DETAILED DESCRIPTION OF THE PREFERRED EMBODIMENTS

Figure 1:
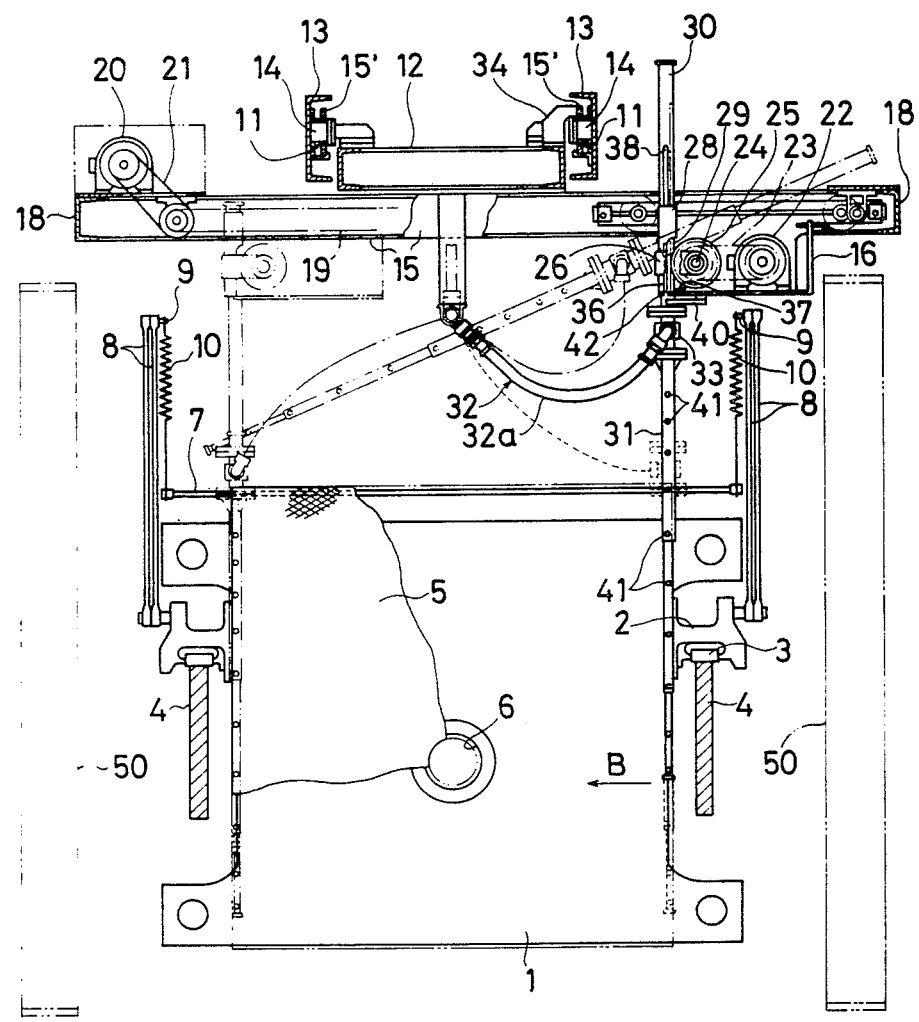
FIG. 1 is a front elevational view partly in vertical cross section of a filter press as a preferred embodiment of the present invention.

A preferred embodiment of the present invention is shown in FIGS. 1 through 6. Each filter plate 1, which is disposed between an unillustrated fixed end plate and a movable end plate, is, as well known, made movable longitudinally along a filter press with travelling rollers 3 arranged on the underside of handles 2 projecting therefrom on both sides thereof supported by a side bar 4 which is arranged vertically between the fixed and the movable end plates on each side thereof. The filter plate 1 is covered with filter cloths 5 on both, front and back, sides thereof. The filter cloths 5 on both sides of the filter plate 1 are sewn together along the periphery of a sludge distribution hole 6. Also, both ends of a filter cloth hanging rod 7 set horizontally and laterally through the French seamed upper end of the filter cloth 5 are hung from the upper connecting pins 9 of a known filter cloth hanging link 8 through a spring 10.

Figure 3:
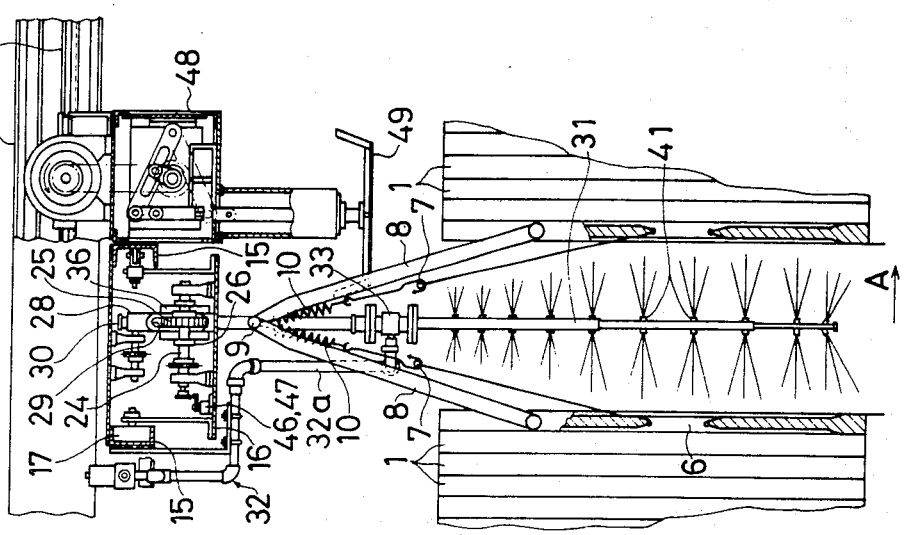
FIG. 3 is a side view partly in section of the embodiment of FIG. 1.
Figure 2:
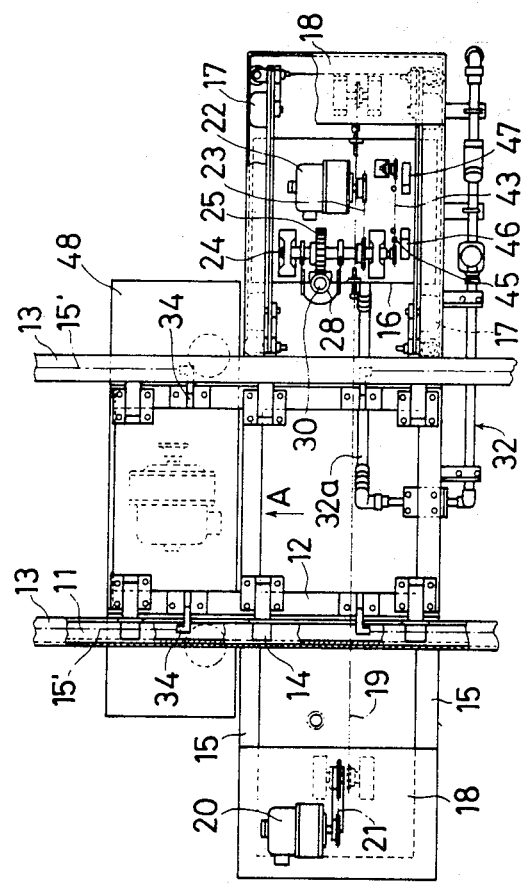
FIG. 2 is a top plan view corresponding to FIG. 1.

The filter press becomes ready for filtration, as well known, when the filter plate 1 is moved on the side bar 4 accompanying the advance of the movable end plate 5 toward the fixed end plate, for instance, in the direction indicated by the arrow A in FIG. 3. Upon completion of filtration each filter plate 1 is moved following the withdrawal of the movable end plate, that is, in the direction opposite to that indicated by the arrow A in FIG. 2 and, as shown in FIG. 3, the adjacent filter plates 1 with both sides thereof covered with filter cloths 5 being successively opened for the filter cake to be released and fall.

According to the present invention, there is provided a first carrier 12 above the filter press of this type supported by rails 11 to be movable longitudinally thereof. The rails 11 are formed on the inside of a pair of girders 13, and the carrier 12 has its end rollers 14 carried by the respective rails 11. The carrier 12 is connected with endless drive belts 15' through connectors 34. As the endless drive belt 15' is driven forward or in reverse by an unillustrated reversible motor, the carrier 12 is moved longitudinally of the filter press, that is, in the direction indicated by the arrow A in FIG. 2 or opposite thereto.

Perpendicular to the first carrier 12 there are provided laterally a pair of rails 15, and a second carrier 16 is supported thereby to be movable in the direction perpendicular to the longitudinal direction of the filter press, that is, along the width thereof. The second carrier 16 has its end rollers 17 carried by the rails 15 and is connected with an endless drive belt 19 set between and around end frames 18, 18 at both ends of the rails 15 through connectors 35. When endless drive belt 19 is driven forward or in reverse by a reversible motor 20 installed on one end frame 18, the second carrier 16 is moved sideways of the filter press, that is, in the direction indicated by the arrow B in FIG. 1 or opposite thereto. Numeral 21 designates a transmission belt between the motor 20 and the endless drive belt 19.

Figure 4:
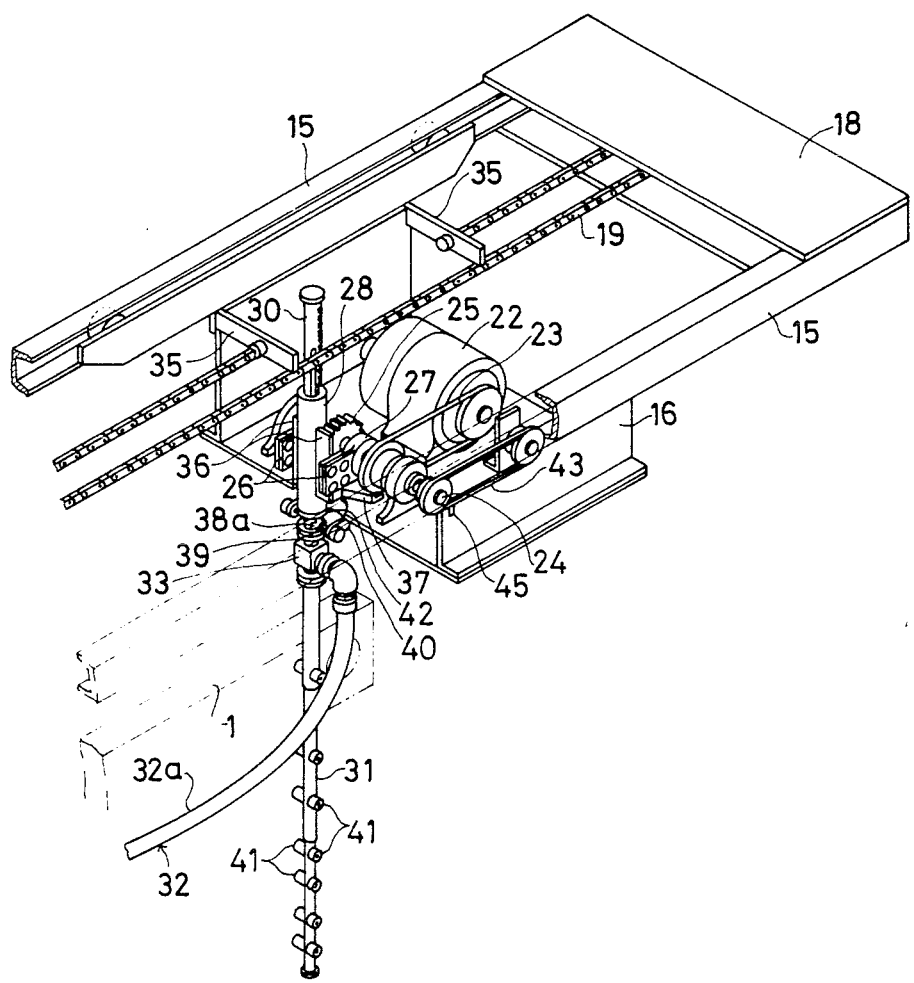
FIG. 4 is a perspective view showing the relationship between a second carrier and a spray tube.
Figure 5:
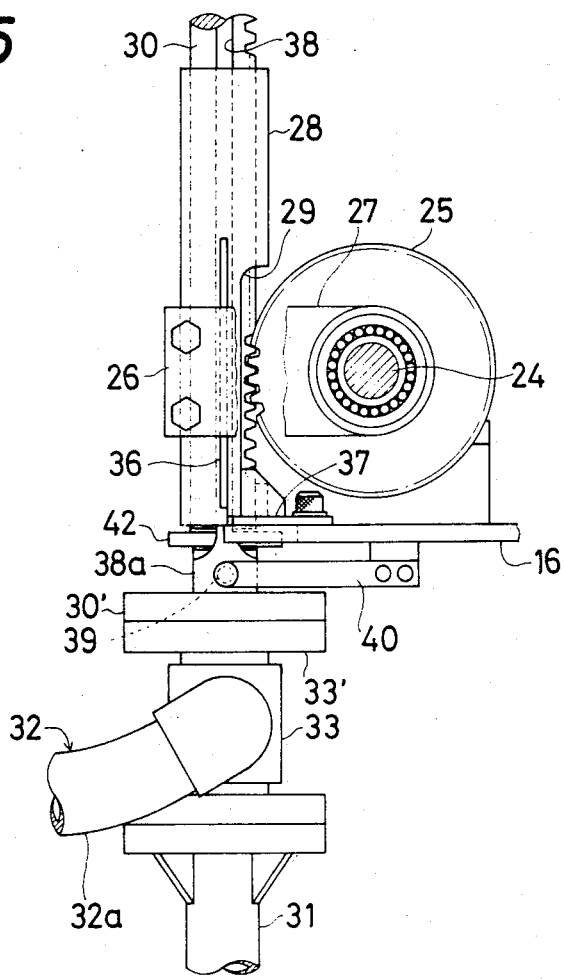
FIG. 5 is an enlarged side view showing an operating device for the spray tube.
Figure 6:
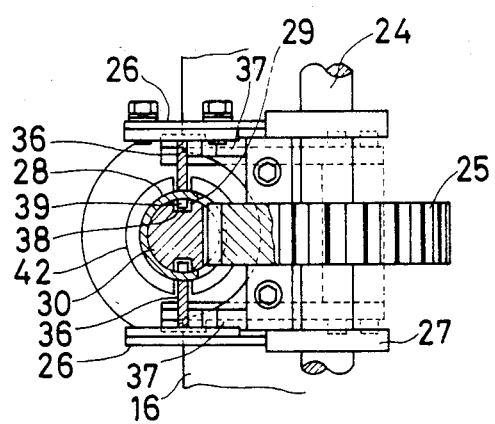
FIG. 6 is a top plan view partly in section corresponding to FIG. 5.

The second carrier 16 has arranged thereon a reversible motor-with-brake 22 and a horizontal revolving shaft 24 driven thereby through a transmission belt 23. A pinion 25 is set fixedly on the revolving shaft 24, and spray tube holders are retained to be freely rotatable thereon through pivot arms 27 as shown in FIGS. 4 through 6. The spray tube holder 26 has its free end formed integral with a guide tube 28 perpendicular to the revolving shaft 24. The guide tube 28 has set freely slidable therethrough a rack rod 30 meshed with the aforesaid pinion 25, and this rack rod 30 has connected to its lower end the upper end of a spray tube 31. As shown in FIG. 5, this spray tube 31 is connected with an end flange 30' of the rack rod 30 through a flange 33' of a connector 33 for a cleaning liquor feed tube 32. The spray tube holder 31 is shiftable between the somewhat slanted waiting position indicated by dashed line in FIG. 1 and the vertical cleaning position indicated by solid line in FIG. 1 as will be further described later.

Shifting of the spray tube 31 from the position indicated by the dashed line in FIG. 1 to the position indicated by solid line takes place as the pinion 25 is driven by the motor 22 counterclockwise in FIG. 1, following its rotary motion through the rack rod 30 for the spray tube 31 has its gravitational (deadweight-induced) counterclockwise rotary moment with the revolving shaft 24 as center. Hence, the above-mentioned rotary shifting takes place counterclockwise together with that of the spray tube holder 26 not accompanied by extension of the rack rod 30 by the pinion 25 with respect to the spray tube 31.

Lugs 36 are fixedly provided on both sides of the spray tube holder 26, and stoppers 37 are provided on the second carrier 16 opposed to the above-mentioned lugs 36 so that lugs 36 come into contact with the stoppers 37 when the spray tube 31 has reached the vertical position indicated by solid line in FIG. 1 to prevent the counterclockwise rotation beyond the vertical position of the spray tube holder 26 and spray tube 31 with the revolving shaft 24 as center. Hence, even if the pinion 25 is further rotated counterclockwise, it effects only extending the rack rod 30 and the spray tube 31 is lowered to the position indicated by broken line in FIG. 1, vertically.

On the side of the rack rod 30 there is provided an axially extending groove 38 with its lower end forming openings 38a to both sides, and a key pin 39 fitting in this groove 38 is secured to the second carrier 16 through a connector 40 so designed that when the spray tube 31 has pivoted down to assume the vertical position indicated by solid line in FIG. 1, the key pin 39 engages in the opening 38a of the groove 38 so as to be positioned on the vertical downward extension of the groove 38. Hence, when the spray tube 31 has come down to the position indicated by broken line from the position indicated by solid line in FIG. 1, the key pin 39 is engaged in the groove 38, and would not be disengaged unless the spray tube 31 is returned to the solid-line position in FIG. 1.

The vertical position shown by broken line in FIG. 1 the spray tube 31 assumes at the lower limit of its stroke is kept unaltered as the spray tube 31 moves from the position indicated by broken line to that indicated by imaginary line in FIG. 1 and back between the adjacent filter cloths 5 when opened as shown in FIG. 3. Hence, the spray tube 31 is kept safe from undesirable oscillation so that the cleaning by the cleaning liquor sprayed through the plurality of nozzles 41 is effected uniformly throughout the entire surface of the filter cloth 5. When cleaning is over, the spray tube 31 returns to the waiting position indicated by the dashed line in FIG. 1, and for that purpose the pinion 25 is rotated clockwise in FIG. 1 by reversing of the motor 22, with the spray tube 31 in the broken line position in FIG. 1. Since the spray tube 31 and the spray tube holder 26 are prevented from rotation with the revolving shaft 24 as center, clockwise rotation of the pinion 25 takes place when the rack rod 30 alone is lifted.

As the rack rod 30 is lifted, also lifted is the spray tube 31, and when the spray tube 31 has reached the solid line position from the broken line position in FIG. 1, the key pin 39 is disengaged from the key way (groove) 38 to be in the opening 38a so that, the spray tube 31 and spray tube holder 26 are allowed to pivot about the revolving shaft 24. At the same time a stopper flange 42 provided integral with the rack rod 30 slightly above the groove's opening 38a near the lower end thereof comes into contact with the lower end of the guide tube 28 of the spray tube holder 26 so as to prevent further lifting of the rack rod 30. Hence, thereafter the clockwise rotation of the pinion 25 effects clockwise pivoting about the revolving shaft 24 of the rack rod 30 together with the spray tube 31 and spray tube holder 26. Thus, the spray tube 31 is shifted back from the solid line position to the dashed line position in FIG. 1.

When the spray tube 31 has reached the predetermined lowered position indicated by broken line or dashed line in FIG. 1, the motor 22 is stopped by triggering of limit switches 46, 47 by an actuator 45 on an endless belt 43 interlocked with the revolving shaft 24 and is kept stopped until it is started again. Simultaneously with stopping of the motor 22 the braking mechanism accessory thereto is actuated for the rack rod 30 and the spray tube 31 to be locked securely through the pinion 25 at either the aforesaid broken line position or dashed line position in FIG. 1, the latter in particular for which there is provided no other position stabilizing means.

The cleaning liquor feed tube 32, leading from outside the filter press, is connected with the spray tube 31 by means of the aforesaid connector 33 through the second carrier 16. Where necessary, flexible tube 32a, freely bendable joints etc. are used lest necessary movement of the second carrier 16 and/or spray tube 31 should be interfered with.

The first carrier 12 is further provided with a filter cloth oscillating device 48 and the filter cloth hanging rod 7 is caused to undergo wavy oscillation by its oscillator 49 for the filter cloth 5 hung by the hanging rod 7 to be oscillated for enhanced releasing of the filter cake adhering thereto. It is also possible for oscillation of the filter cloth 5 to proceed simultaneously with cleaning thereof if the oscillator 49 is so arranged that it is parallel to the aforesaid spray tube 31 along its width off its sideway stroke in the filter press.

In the illustrated embodiment oscillation and cleaning action are applied successively to the filter cloths when opened as shown in FIG. 3.

Cleaning of filter cloths 5 is done successively by shifting the spray tube 31 in the waiting position indicated by dashed line in FIG. 1 above the filter plates 1 as they are opened successively after each cycle of filtration without interfering with the filter cloths 5 etc. through movement of the first carrier in the direction indicated by the arrow A. Each time after shifting the spray tube 31 is pivoted down to the position indicated by solid line in FIG. 1 by the motor 22 running forward between the opened pair of filter plates 1, i.e. between the filter cloths 5 covering the opposing sides of the adjacent filter plates 1, then it is lowered to the position indicated by broken line in FIG. 1 and the motor 22 is thereupon stopped. The motor 20 is then started forward for moving the second carrier 16 in the direction indicated by the arrow B and the spray tube 31 is thereby moved to the position indicated by phantom line. When the spray tube 31 has reached the phantom line position, the motor 20 is reversed to move the second carrier 16 in the direction opposite to that indicated by the arrow B for the spray tube 31 to be returned to the broken line position in FIG. 1.

The spray tube 31 is fed with the cleaning liquor to spray it onto the filter cloths 5 as illustrated in FIG. 3 as it travels both-ways between the opened pair of filter plates 1.

Depending on the material of the filter cloth 5, the kind of the filter cake, the way the filter cake adheres etc., it is also possible to do cleaning in repeated strokes or cycles. When cleaning is over with the spray tube 31 returned to the broken line position in FIG. 1, the motor 22 is reversed to first lift the spray tube 31 to the solid line position in FIG. 1 and then restore it to the waiting position indicated by phantom line in FIG. 1.

After thus cleaning all filter cloths 5 the first carrier 12 is moved in the direction opposite to that of the arrow A back to the initial position and waits there until the next cycle of cleaning is started.

On both sides of the filter press curtains 50 as outlined in phantom line in FIG. 1 are hung from unillustrated curtain rails to be freely slidable to open or close, these serving to prevent the cleaning liquor from splashing away.

According to the present invention, a spray tube pivotable about a horizontal shaft and also displaceable along its own axis is attached to a second carrier movable longitudinally as well as sideways, is connected with a cleaning liquor feed tube, the spray tube is pivotable down into place between the opened filter cloths (from above) and is made axially displaceable between there and the predetermined position it is to assume for proper cleaning. Hence, even if a long spray tube advantageous for cleaning of the front side of the filter cloth is used, it can be shifted from the waiting position, in which it can be moved longitudinally of the filter press without unduly projecting above it, to the predetermined position between the filter cloths by pivoting about the aforesaid horizontal shaft without projecting beyond the side of the filter press and without interfering with any other component. Hence the space surrounding the filter press can be effectively utilized for other purposes and, moreover, since the spray tube is pivotable down into place between the filter cloths and can be brought to the position necessary for proper cleaning by axial displacement, advantageous cleaning of the entire surface of filter cloth is securely feasible by the use of a long spray tube without loss of any of the aforesaid features.

Another embodiment of the present invention is shown in FIGS. 7 through 10. As in the aforesaid embodiment, a first carrier 56 is provided above the filter press to be freely movable in the same direction as filter plates 52. This first carrier 56 is provided with a second carrier 57 to be freely movable parallel to the filter plate surface. Two arms 58a and 58b are pivotally linked by a pin 59, and the other end of the arm 58a is pivoted to the aforesaid second carrier 57. As is clear from FIGS. 8 and 10, the arms 58a and 58b are pivotally linked as aforesaid to be freely rotatable in a plane parallel to the surface of the filter plate. The arm 58b is provided with an arm stopper 60, so that when the arm 58a is off the limit of its rotation, the rotation of the arm 58b with respect to the arm 58a is limited thereby. The other end of a solid spray tube 55 connected to an unillustrated cleaning liquor source through a feed tube 61 to be described later is fixedly connected to one end of the arm 58b. With rotation of the arm 58a by an arm driving means 62 provided on the second carrier 57, the spray tube 55 is pivoted from the waiting position above the filter plate to the vertically downward position and into place between filter cloths 54 covering the opposing sides of an opened pair of filter plates 52, 52.

The first carrier 56 has left and right rollers 64 on shafts extending sideways from the top of a supporting member 63 placed thereon about the center supported by a lateral pair of rails 65, 65 disposed parallel to side bars 51, 51 above the filter plates so that it is freely movable along the direction in which the filter plates move. This first carrier 56 is connected with chains 66, 66 extending along the aforesaid rails 65, 65, which are driven each time an adjacent pair of filter plates 52 are opened, and the first carrier 56 is successively moved so that the spray tube 55 carried thereby is brought to the position just between the opened pair of filter plates 52.

Figure 7:
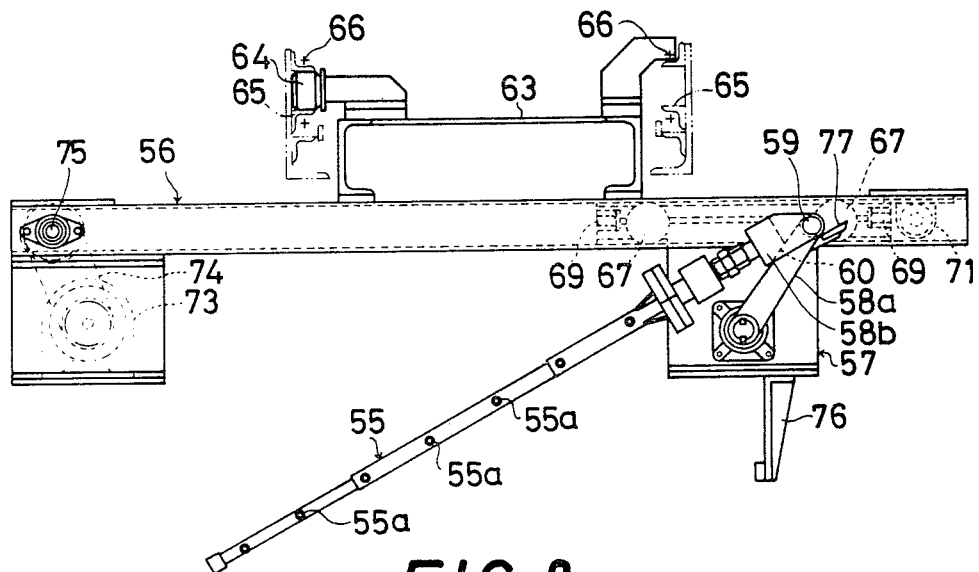
FIG. 7 is a front elevational view of a second embodiment of the present invention.
Figure 8:
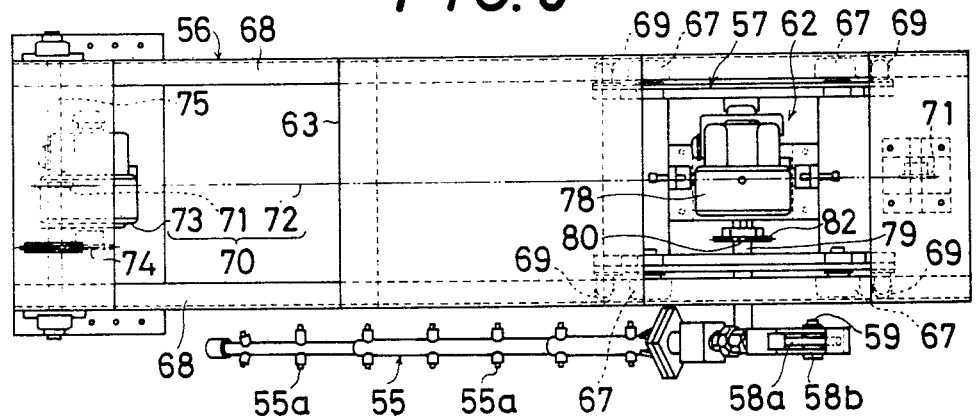
FIG. 8 is a top plan view thereof.

As seen from FIGS. 7 and 8, a second carrier 57 is made freely movable horizontally and parallel to the surfaces of filter plates, that is, transverse to the direction of movement of the first carrier 56 with four rollers 67 on shafts extending parallel above the top thereof, i.e. at the four corners thereof, carried by a pair of rails 68, 68 which also serve as lateral members of the frame of the first carrier 56. In FIG. 8 numerals 67 designate the rollers at the four corners of the second carrier 57, which fit in and are carried by the aforesaid rails 68, 68 for the second carrier 57 to move smoothly along them.

A driving means 70 for moving the second carrier 57 is carried by and between sprockets 71, 71 on both end portions of the first carrier 56 and includes a chain 72 with the second carrier 57 connected thereto and a motor 73 for driving the sprocket 71 on one side of the first carrier 56. The torque of the motor 73 is transmitted to a revolving shaft 75 through a chain 74 and is used to drive the sprocket 71 fixedly set on the revolving shaft 75.

With feed tube 61, which feeds the cleaning liquor from the cleaning liquor source to the spray tube 55 and extends from the supporting member 63 of the first carrier 56 to the base of the spray tube 55, is used a flexible tube 61a dimensioned to have an ample slackness. Displacement of the spray tube 55 from the waiting position, close to the horizontal, to the vertical position (for spraying) and the movement of the second carrier 57 are thus allowed and, furthermore, flexible tube is used also amid the unillustrated piping between the supporting member 63 of the first carrier 56 and the cleaning liquor source lest the movement of the first carrier (movable frame) 56 should be interfered with.

Figure 10:
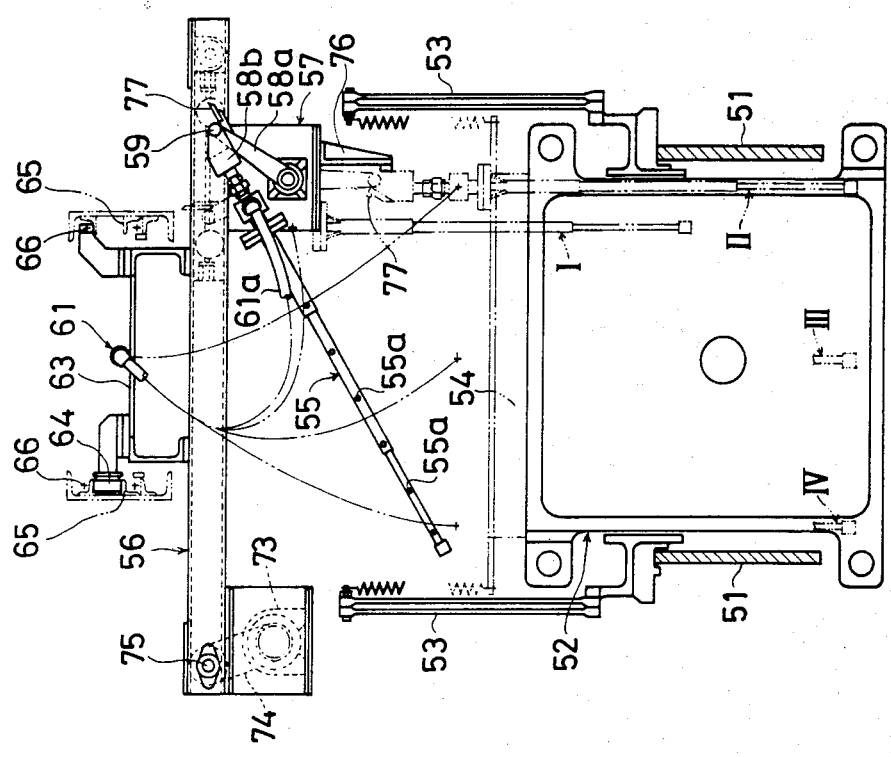
FIG. 10 is a front elevational view of the filter press showing the alternate positions the spray tube assumes.
Figure 9:
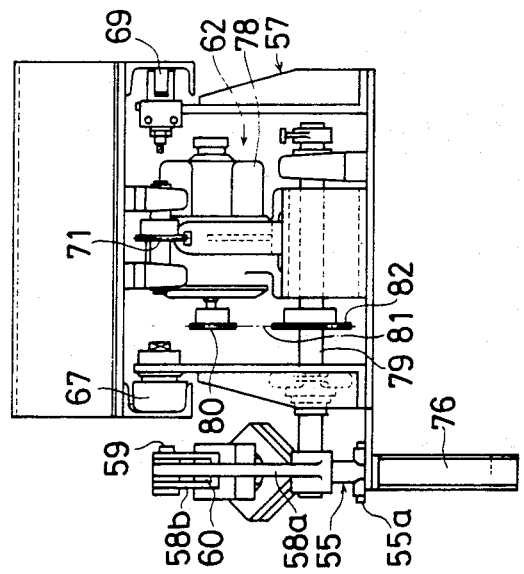
FIG. 9 is an enlarged right side view of the embodiment of FIG. 7.

As seen from FIGS. 7 and 10, the second carrier 57 has pending from its underside an arm receiving member 76. Also, another arm receiving member 77 is provided projecting from the connected end of the arm 58a so that, when the arm 58a is positioned right downward for the spray tube 55 to be in the downward vertical position as shown in phantom in FIG. 10, the arm 58b is sandwiched between the arm receiving members 76 and 77. Thus, as the spray tube 55 moves sideways along the filter plate, it is kept vertical as indicated by I, II, III and IV in FIG. 10.

The arm driving means 62 includes a motor 78 and a torque transmission shaft 79, and the torque generated by the motor 78 is conveyed to the torque transmission shaft 79 through a sprocket 80, chain 81 and another sprocket 82 for the arm 58a fixedly secured to the torque transmission shaft 79 to be rotably driven thereby.

In the periphery of the spray tube 55 there are provided a plurality of nozzles 55a opening forward and rearward with respect to the first carrier 56, and the cleaning liquor fed from the cleaning liquor source to the spray tube 55 through the feed tube 61 is sprayed uniformly distributed through these nozzles 55a.

In this embodiment cleaning is performed in the following way.

After completion of filtration the withdrawing motion of the individual filter plates 52 is detected by the detecting elements such as limit switches, the unillustrated motor for driving the first carrier is started by the detection signal, and the first carrier 56 is driven thereby on the rails 65, 65 in the direction opposite to the withdrawing direction of the filter plates 52.

The second carrier 57 then stands by on one side of the first carrier 56, while the arm 58a is in an upward position as shown in FIG. 7. Hence, the arm stopper 60 comes into contact with the arm 58a, the spray tube 55 is prevented thereby from its gravitational pivoting toward the vertically downward position, and is held above the filter plates 52 and filter cloths 54 in a slightly inclined position lest it should interfere therewith.

The first carrier 56 stops when it has moved to where the spray tube 55 is located between an adjacent pair of opened filter plates 52, 52. Then, when the arm driving means 62 is started, the arm 58a starts rotating counterclockwise in FIG. 10.

As the arm 58a rotates, the spray tube 55 gradually moves toward the vertically downward position as indicated by I in FIG. 10. Then, the spray tube 55 starts lowering in its vertically downward position due to the articulated motion of the arm 58a with respect to the arm 58b, and stops when the arm 58a has reached the right downward position. The spray tube 55 then assumes the position II in FIG. 10.

When the spray tube 55 has reached the vertically downward position, feeding of the cleaning liquor from the cleaning liquor source through the feed tube 61 to the spray tube 55 is started.

Then the second carrier driving means 70 is started, the second carrier 57 starts moving from its waiting position toward the other end of the first carrier 56, and the filter cloth 54 is successively cleaned from one side to the other side thereof by the cleaning liquor sprayed through the individual nozzles 55a of the spray tube 55 moving leftward in its vertically downward position. When the spray tube 55 has reached the other side of the filter cloth 54 moving from the position III to the position IV in FIG. 10, the motor 73 of the 2nd carrier driving means 70 is reversed and the second carrier 57 starts moving in the opposite direction.

Upon return of the second carrier 57 to the initial waiting position the second carrier driving means 70 is stopped with simultaneous stopping of feeding of the cleaning liquor to the spray tube 55.

Then the motor 78 of the arm driving means 62 is reversed, the arm 58a starts rotating clockwise in FIG. 10 and reaches the position where the arm stopper 60 comes into contact with the arm 58a for the spray tube 55 to be prevented from its gravitational rotation toward the vertically downward position. The course thereafter is the opposite of the "pivoting down steps" described above, and the spray tube 55 returns to the initial waiting position from between the filter plates 52 or filter cloths 54.

When the spray tube 55 has returned to the initial waiting position, the motor 78 of the arm driving means 62 is stopped temporarily and then the process described above is repeated in cycles, this interlocked with movement of the filter plates 52.

When all filter plates have moved toward the movable end plate side and the spray tube 55 has gone through the last cycle of pivoting down into place between the filter cloths 54, spraying and withdrawal therefrom, the motor for driving the first carrier 56 is reversed and it is stopped when the first carrier 56 has been restored to the initial position to be kept waiting until the start of the next cleaning cycle.

The filter cloth cleaning device of the present invention has advantages as enumerated below.

(A) It is possible to let the spray tube pivot down into place between the filter cloths and let it withdraw therefrom with the spray tube shifting means kept in the waiting position. Since the aforesaid pivoting down into place and withdrawal to the waiting position of the spray tube is done through a combination of rotary, lifting and lowering motions by means of a pinion-rack mechanism and articulated arm mechanism, it is not necessary to set the spray tube shifting stroke excessively because of the required pivoting down and withdrawal thereof, hence the cleaning device can be arranged compactly above the group of filter plates.

(B) The spray tube can be stored when not in use slightly slanted downward in the space above the group of filter plates, so that, even when the spray tube is long, it is possible to keep its forward end from extending beyond the outermost filter plate even in its stored position. Hence, this cleaning device is not only simple in construction but is is also reasonably small in space requirement, not interfering in this respect with other accessories of the filter press such as the filter cloth oscillating device.

(C) The cleaning device of the invention can be arranged above the group of filter plates where there is relatively ample space and little risk of the device being splashed with the used cleaning liquor, so that soiling or corrosion of the device can be prevented without difficulty and, moreover, the device can be installed with greater ease.

What is claimed is:

1. In a cleaning device for a filter press wherein, a spray tube is movable into a position between spaced adjacent pairs of filter plates for cleaning the filter plate surface and filter cloth, including a first carrier disposed above the filter plates movable into positions between open pairs of adjacent filter plates, a second carrier movably mounted on the first carrier to move in opposite directions thereon parallel to the surfaces of the filter plates, a spray tube supporting means mounted on the second carrier, a spray tube pivotally mounted on the second carrier and a flexible tube connected at one end to the outlet of a source of cleaning liquid on the first carrier and at the other end to the spray tube for supplying cleaning liquid thereto, the improvement comprising:

a spray tube operating shaft rotatably mounted on the second carrier;
a reversible motor means mounted on the second carrier;
means operatively connecting said motor means to said shaft to drive said shaft by said motor means;
a pinion gear mounted on said shaft to be rotated therewith;
a spray tube support arm means pivotally mounted on said shaft and having an outer end;
a rod element on the upper portion of said spray tube;
a spray tube support tube mounted on said outer end of said support arm telescopingly receiving said rod portion therein;
a gear rack in said rod portion extending substantially parallel with the central axis of said spray tube and operatively engaging said pinion gear;
at least one lug on said spray tube support tube;
at least one lug stopper member on the second carrier cooperatively engageable with said at least one lug;
at least one keyway in said rod portion extending in said rod portion extending substantially parallel to the central axis of said spray tube;
at least one key pin on the second carrier slidably engageable in said at least one keyway; and
a stopper on said rod member adjacent the juncture with said rod element cooperatively engageable with said support tube;
so that operation of said motor means in one direction pivotally moves said spray tube about said shaft between a non-use position above the filter plates and a substantially vertical position between adjacent filter plates, said at least one lug member and cooperating stopper engaging to prevent said pivotal movement beyond said substantially vertical position and said pinion gear drives said rack to move said spray tube downwardly with respect to said support tube into an extended position for use, and operation of said motor means in the reverse direction after use raises said spray tube vertically to a position of said cooperating engagement between said stopper on the rod member and said support tube to prevent further vertical raising of said spray and said pinion gear pivotally moves said spray tube to said non-use position.

2. A cleaning device as claimed in claim 1, and further comprising:
a longitudinal slot in said support tube to receive said pinion gear therein wherein said pinion gear engages said gear rack;
said support tube has an upper and a lower end; and
said stopper on said rod member is cooperatively engageable with said lower end of said support tube.

3. In a cleaning device for a filter press wherein, a spray tube is movable into a position between spaced adjacent pairs of filter plates for cleaning the filter plate surface and filter cloth, including a first carrier disposed above the filter plates movable into positions between open pairs of adjacent filter plates, a second carrier movably mounted on the first carrier to move in opposite directions thereon parallel to the surfaces of the filter plates, a spray tube supporting means mounted on the second carrier and a flexible tube connected at one end to the outlet of a source of cleaning liquid on the first carrier and at the other end to the spray tube for supplying cleaning liquid thereto, the improvement comprising:

a spray tube operating shaft rotatably mounted on the second carrier;
a reversible motor means mounted on the second carrier;
means operatively connecting said motor means to said shaft to drive said shaft by said motor means;
a spray tube operating arm mounted on said shaft to be rotated thereby and extending radially therefrom;
a spray tube support member pivotally connected to said arm at a pivot position radially spaced from said shaft, and supporting said spray tube thereon;
a stop means on said support member cooperatively engageable with said arm when said arm is in a non-used storing position with the pivotal connection above said shaft so that said spray tube is held above the filter plates;
a first support member receiving stop element projecting from said arm substantially oppositely relative to said spray tube; and
a second support member receiving stop element projecting downwardly from the second carrier;
said stop elements being positioned so that when said arm is in a position for use where the pivotal connection is below said shaft and said spray tube is substantially vertical, said support member is engaged on opposite sides by respective stop elements to retain said spray tube substantially vertically.

* * * * *